May 29, 1934.  L. IVERSEN  1,960,814
APPARATUS FOR SHEARING
Filed Feb. 2, 1933   3 Sheets-Sheet 1
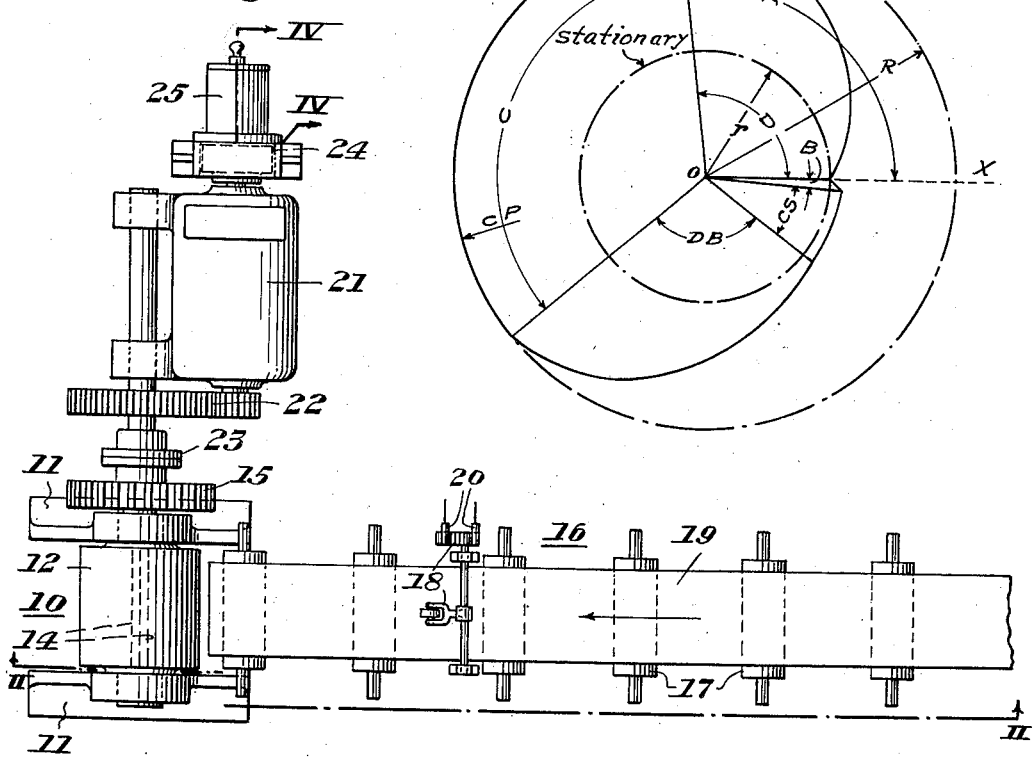
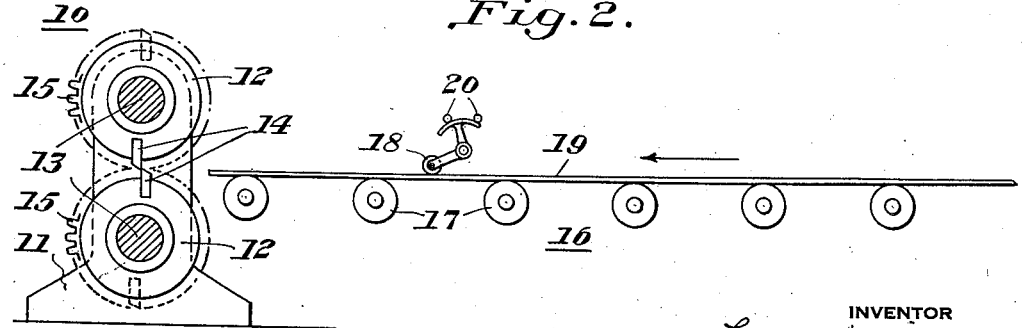
INVENTOR
Lorenz Iversen
by his attorneys
Byrnes, Stebbins, Parmelee & Blenko

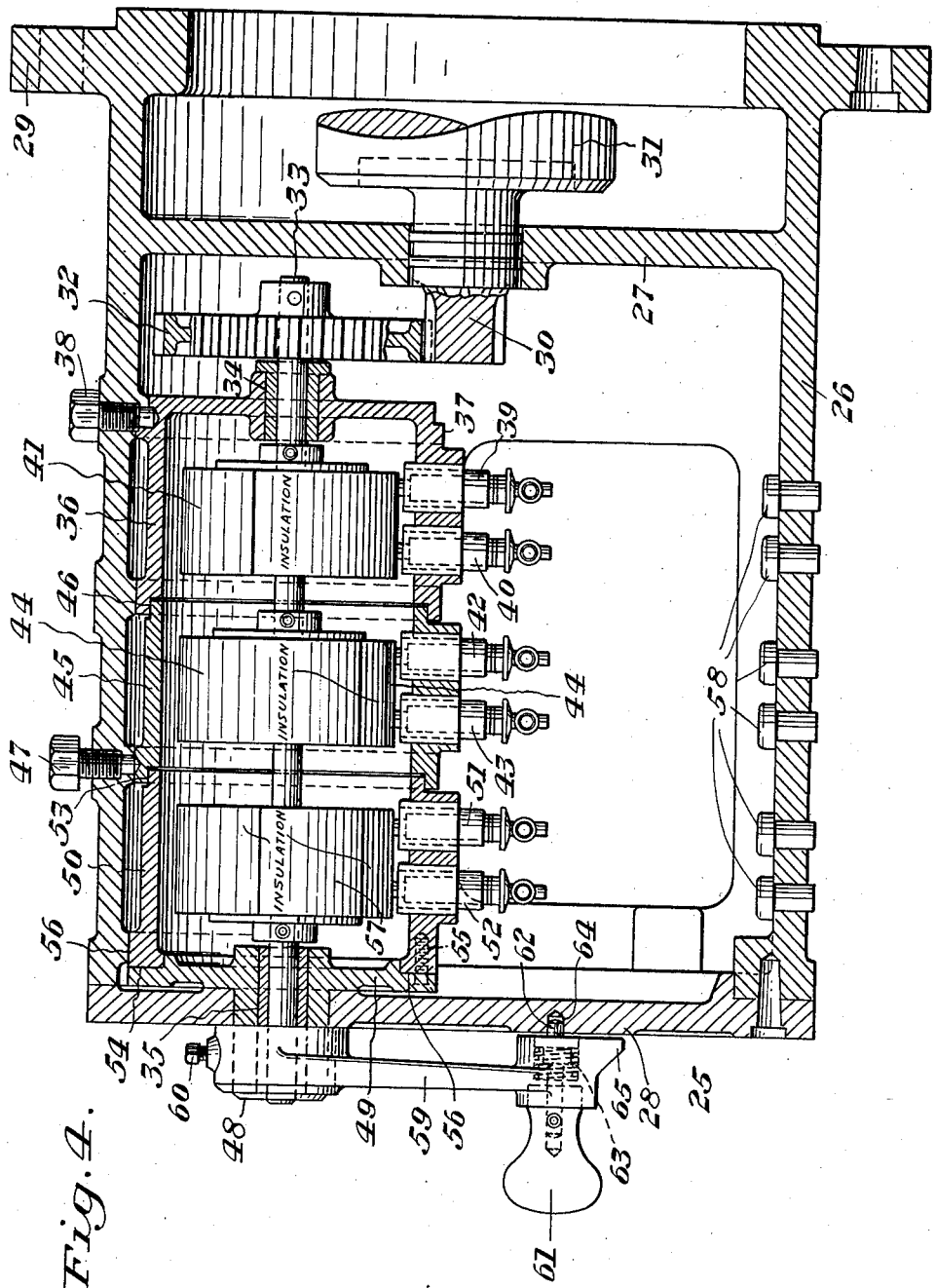

May 29, 1934.  L. IVERSEN  1,960,814
APPARATUS FOR SHEARING
Filed Feb. 2, 1933  3 Sheets-Sheet 3

INVENTOR
Lorenz Iversen
by his attorneys
Byrnes, Stebbins,
Parmelee & Blenko

Patented May 29, 1934

1,960,814

UNITED STATES PATENT OFFICE 1,960,814

APPARATUS FOR SHEARING

Lorenz Iversen, Pittsburgh, Pa., assignor to Mesta Machine Company, Homestead, Pa., a corporation of Pennsylvania Application February 2, 1933, Serial No. 654,818

17 Claims. (Cl. 164—68)

My invention relates broadly to the art of metal working and, more particularly, to a control system for rotary shears whereby they may be employed for cutting lengths of material into pieces having a given length.

This is a continuation in part of my co-pending application Serial No. 284,193, filed June 9, 1928, for Method of and apparatus for shearing.

It is well known in the art of shearing material to operate an intermittent reciprocating shear by the engagement of the leading end of the material entering the shear with a flag or other equivalent device. Shears of this type have the advantage that after each shearing cut, they always return to their initial position. It is thus possible accurately to determine the length of material cut from the leading end of the piece by properly positioning the flag. It is obvious that the three factors determining the length of the initial cut, namely, the distance between the flag and the shear, the speed of the material, and the time necessary for the shear to move from its initial to its cutting position, may be adjusted to provide almost any desired result.

It is also known in the shearing art that a rotary shear is capable of operating at much higher speeds than shears of the reciprocating type. The use of rotary shears heretofore, however, despite their higher speed of operation, has been strictly limited because it has not been possible to control such shears readily so that they will always return, after the last cut, to a fixed initial position so that a predetermined front end crop may be made on the first cut of successive lengths. As heretofore employed, rotary shears have been effective to make a front end crop of variable length up to the maximum length for which the shear is operated. Such waste of material, obviously, has made it impractical to employ rotary shears for the purposes herein contemplated.

I have invented a control system for rotary shears such that shears of this type can be employed for cropping the front ends of successive lengths, as well as for continuously cutting said lengths into short sections of predetermined length, as well as into longer sections, for example, cooling bed lengths. My invention causes a rotary shear to return to a predetermined initial position upon stopping, regardless of whether it has been operated to make a single front end cropping cut or a plurality of successive cuts in shearing a length into sections. Since a rotary shear may be made to return always to the same initial position, by my invention, it is then possible to use shears of this type for making front end cropping cuts as well as intermediate cuts, and thereby to take advantage of the higher speed of operation characterizing rotary shears when compared to the earlier types of reciprocating shears.

In accordance with my invention, I provide a control system for a rotary shear which causes the shear operating motor to pass through a predetermined cycle between each cutting operation. The movement of the shear blades is arrested at on point in each cycle, regardless of whether the shear is being operated continuously to cut short sections or at longer intervals to shear cooling bed lengths. The operation of the shear motor is controlled by a drum type controller which is directly connected to the motor shaft. The controller is effective to bring about the desired changes in the motor circuit at the proper times and, after each cutting operation, to bring the motor and the shear to rest in a predetermined position. The members of the drum controller are preferably adjustable to provide flexibility in the operating cycle.

For a more complete understanding of the invention, reference is made to the accompanying drawings illustrating a present preferred embodiment. It is to be understood, however, that many changes in the apparatus and circuits described and illustrated can be made within the scope of my broader claims. In the drawings:

Figure 1 is a diagrammatic plan view showing a rotary shear and a run-out table adapted to receive material, for example, from the last stand of a continuous mill, for delivering it to the rotary shear;

Figure 2 is a sectional view along the line II—II of Figure 1;

Figure 3 is a graphical representation of the operating cycle of the shear and motor;

Figure 4 is a sectional view substantially along the line IV—IV of Figure 1 showing the details of the construction of the drum controller;

Figure 6:
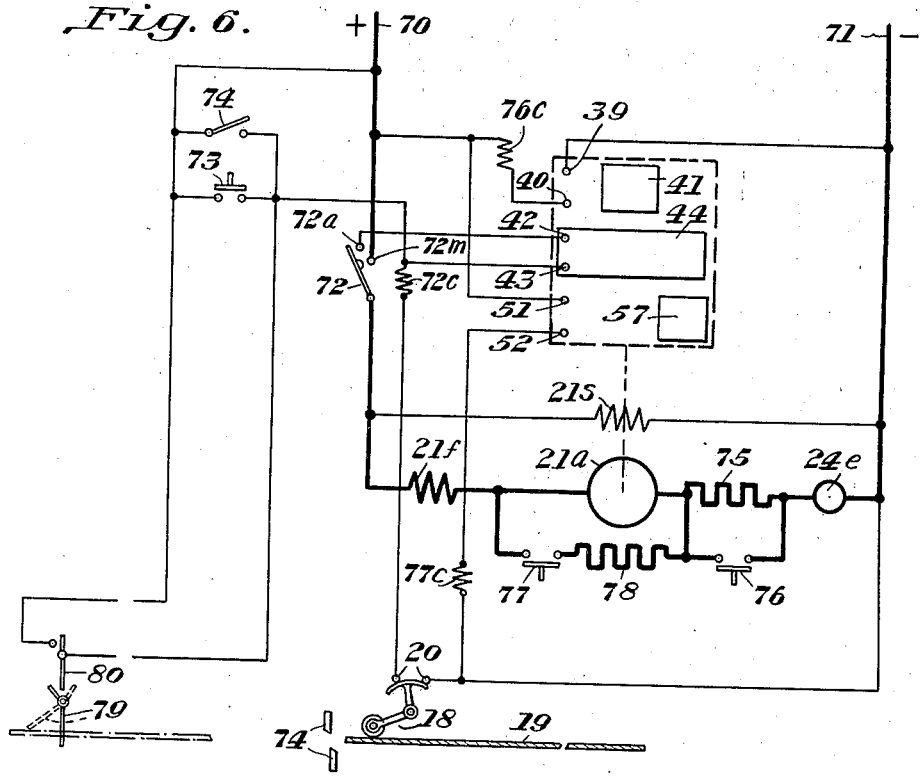
Figure 6 is a circuit diagram illustrating the electrical connections insuring the desired sequence of operations in each shearing cycle.

Referring now in detail to the drawings and, for the moment, to Figures 1 and 2, the preferred embodiment of my invention comprises a shear 10 of any desired construction. As an example, I have shown a shear having housings 11 with cylinders 12 mounted on shafts 13 journaled in the housings. The cylinders are provided with shearing blades 14 which cooperate to effect a severance of material fed thereto. The cylinders are connected by spur gears 15 in the usual manner so that their speeds bear a predetermined relation to each other.

A run-out table 16 is disposed in position to deliver material to the shear 10. The table is indicated diagrammatically by the conveying rolls 17 thereof since the details of such tables are well known and need no description here. A flag 18 is positioned adjacent the table so as to be operated by material moving therealong, such as the piece indicated at 19. Contacts 20 are bridged by a conducting member actuated by the flag when the latter is engaged by the piece 19.

A motor 21 is provided for driving the shear 10 and is connected thereto through speed reducing gearing 22 and a coupling 23. The motor 21 is preferably a standard mill type motor and is provided with a brake 24 of the usual type having an electromagnet effective to release the brake when current is supplied to the motor, the brake being set by mechanical means, such as a spring, at all other times. A controller 25 of the drum type is connected to an extension of the shaft of the motor 21 for effecting the desired sequence of operations necessary for a complete cutting cycle.

Figure 5:
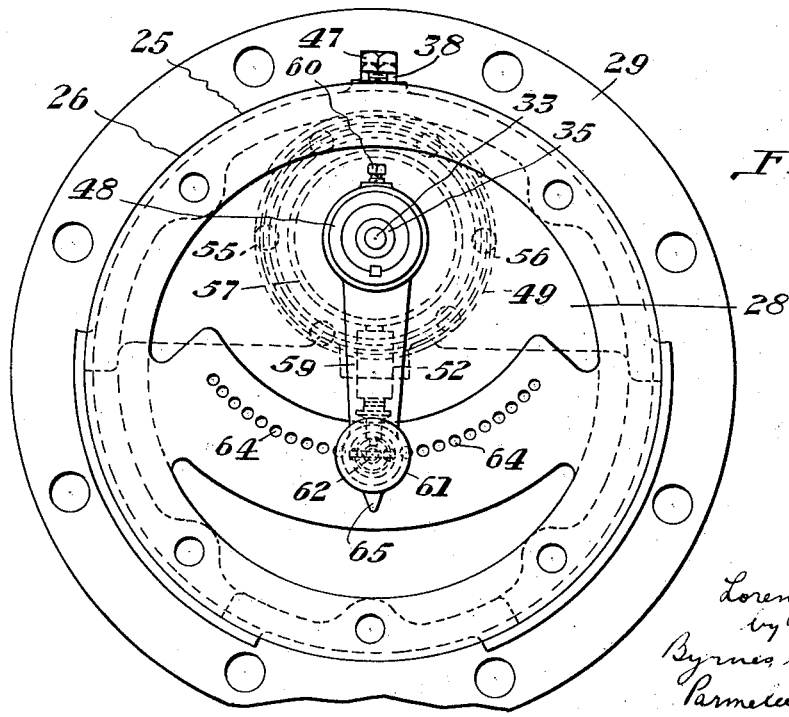
Figure 5 is an end elevation of the controller.

Referring now to Figures 4 and 5, I shall describe the construction of the controller 25 in detail before explaining the operating cycle as illustrated graphically in Figure 3 and the circuit diagram of Figure 6. The controller 25 comprises a cylindrical housing 26 having an end wall 27, a removable cover 28 and an attaching rim 29 by which it may be secured to any convenient support, such as the frame of the brake 24. The end wall 27 has a central opening for receiving the reduced end 30 of the shaft of the motor 21 which is indicated at 31. Pinion teeth are formed on the reduced end 30 for meshing with a gear 32 secured to a shaft 33 for driving the latter.

The shaft 33 is journaled in bearing sleeves 34 and 35. The sleeve 34 is positioned in a central opening in the end wall of an adjustable contact cup 36 which is rotatably positioned in a seat 37 machined on the interior of the housing 26. A set screw 38 holds the cup 36 in adjusted position. Contact fingers 39 and 40 extend radially through the side wall of the cup 36 for cooperation with a conducting segment 41 secured to but insulated from the shaft 33.

Contact fingers 42 and 43 for cooperation with a conducting segment 44 also mounted on but insulated from the shaft 33, extend radially through a cylindrical ring 45 similar to the cup 36 except that it has no end wall. The ring 45 and the cup 36 have a machined fit at 46. A set screw 47 holds the ring 45 in adjusted position.

The sleeve 35 forming the left-hand bearing for the shaft 33 as viewed in Figure 4 is positioned in a hub 48 formed on a disc 49 which constitutes a removable end wall for a contact ring 50 similar to the ring 45 and having contact fingers 51 and 52 extending radially thereinto. The contact supporting rings 45 and 50 have a machined fit at 53. The ring 50 and the disc 49 have a similar fit at 54, are secured together by screws 55, and fit into a seat 56 machined in the housing 26. A contact segment 57 is mounted on the shaft 33 within the ring 50 for cooperation with the contact fingers 51 and 52. Insulating bushings 58 extend through the side wall of the housing 26 for receiving control circuit conductors secured to suitable terminals on the contact fingers.

An adjusting handle 59 is secured to the hub 48 by set screws 60 and has a retractible knob 61 at the free end thereof. The knob 61 has a plunger 62 which is normally urged by a spring 63 to enter one of a series of holes 64 in the cover 28. A pointer 65 is provided on the handle 59 for cooperation with any desired indicating scale (not shown).

Movement of the handle 59, of course, shifts the position of the disc 49 and the ring 50, as well as the fingers 51 and 52 relative to the segment 57. The rings 36 and 45 are secured in their initially adjusted position by the set screws 38 and 47. The position of the fingers 51 and 52 relative to the segment 57, of course, determines the instant during the shearing cycle at which the dynamic braking begins. The setting of the handle 59 thus determines the initial position of the shear blades and, therefore, the length of the initial cut. It is possible to vary the length of the pieces cut by changing the gear ratio between the shaft 31 and the shaft 33. Ordinarily, however, the device will be designed to shear a certain fixed length at all times.

The operation of the shearing apparatus controlled in accordance with my invention may be best understood by an explanation of Figure 6 in which the various pieces of apparatus are illustrated schematically, together with the control circuits connecting them. As before stated, Figure 3 illustrates graphically the desired cycle of operations. This graphical representation is based on a polar coordinate system except that the zero is not at the origin but at a fixed distance therefrom. The radius $r$ indicates zero speed or, in other words, the stationary position of the shear. The radius $R$ indicates the full speed of the shear. The control system to be described presently is effective for starting the system from rest indicated by the line OX and accelerating through the angle A with the increase in speed indicated in Figure 3. When the shear has reached its full speed at which the shear blades travel at substantially the same speed as the material being fed to the shear, the blades 14 engage the material at some point in the angle C, such as that indicated at CP to effect a shearing cut. Immediately after the shearing cut, I provide for dynamic braking of the shear motor through the angle DB. During this interval, the speed of the shear and motor is decreased as indicated, but when it has reached a predetermined value, it is maintained constant for a time, as shown in the angle CS. During this interval, the motor and shear are driven at a low, creeping speed. The next and concluding step in the cycle is the application of the brake 24 to stop the shear and motor at a given point in the cycle. Succeeding cycles are a repetition of that just described. Since the motor and shear are moving at the same speed, in every cycle, when the electromagnetic brake is released, the extent of drifting movement is always the same so that the point at which the shear and motor actually stop may definitely be predetermined. The point at which the movement of the shear and motor at creeping speed terminates, fixes the initial or stopping position, and the drum switch shown in Figures 4 and 5 permits ready adjustment of this instant, as will now be more fully explained.

In addition to the shear motor and drum switch, Figure 6 includes other auxiliary control devices which are of standard design, require no specific description, and will, therefore, be pointed out as the description of operation proceeds.

Current is supplied to the armature 21a and series field 21f of the shear motor 21 from a supply source indicated at 70, 71, under the control of a main contactor 72 having a closing coil 72c. A push button switch 73 is provided for effecting operation of the shear under manual control. A switch 74 is provided for effecting continuous operation.

If it is desired to effect a single front end cropping cut of a piece of material, such as 19, the push button switch 73 is held closed as the piece is delivered by the run-out table 16 to the shear 10. The shear is stationary under normal conditions. If the switch 73 is held closed, a circuit will be completed for the coil 72c of the contactor 72 by the flag 18 at a predetermined time in advance of the arrival of the leading end of the piece at the shear, depending upon the speed of the material and the distance between the flag and the shear. This circuit extends from the supply source at 70 through the switch 73, the coil 72c, and the contacts 20 bridged by the flag switch in its upper position, to the supply at 71. The contactor 72 closes and completes a circuit at its main contact 72m for the motor 21. This circuit extends from the supply source at 70 through the contact 72m, the contactor 72, the series field 21f and the armature 21a of the shear motor 21, a starting resistor 75, and a release coil of the magnet 24 indicated at 24e, to the supply at 71. The shunt field 21s is simultaneously energized.

The drum switch 25 is shown developed in Figure 6, in accordance with the usual convention. In the initial position of the shear, the segment 44 of the drum switch bridges its contact fingers 42 and 43. The operation of the contactor 72 thus completes a sealing circuit for the coil 72c of the contactor through its auxiliary contact 72a, the circuit extending from the supply at 70, the main contact 72m, the contactor 72, its auxiliary contact 72a, contact finger 42, segment 44, contact 43 of the drum switch, the coil 72c of the contactor, and the contacts 20 bridged by the flag 18 to the supply at 71. When the contactor 72 has been closed and locked in, as described, the push button switch 73 is released or, in other words, the push button may be released almost instantaneously after the engagement of the piece 19 with the flag 18.

The motor circuit being completed as above described, the motor 21 accelerates to bring the shear blades up to the speed of the material on the table 16. As the motor speeds up, it advances the drum switch 25 and after a predetermined interval, the segment 41 engages the contact fingers 39 and 40 to complete an obvious energizing circuit for the operating coil 76c of the contactor 76. The energization of the coil closes the contact and shunts the starting resistor 75, placing the shear motor directly across the supply source 70, 71. The motor 21 thus quickly reaches its shearing speed.

By the time the motor has reached full speed, the shear blades have moved from their initial position to the cutting position, indicated at CP in Figure 3. Shortly after the completion of the cut, the segment 41 leaves its contact fingers 39 and 40. The contactor coil 76c is thus deenergized and the contact 76 opened. This reinserts the resistor 75 in the motor circuit and tends to decelerate the motor. Substantially simultaneously, the segment 57 of the drum switch 25 bridges its contacts 51 and 52 completing an obvious energizing circuit for the coil 77c of the contactor 77. The closing of the contactor 77 connects a dynamic braking resistor 78 across the armature 21a of the motor 21.

If the speed of the motor 21 is above a certain predetermined low value, the motor will operate as a generator in the known manner to circulate current through the resistor 78. This dynamic braking operation promptly decelerates the motor still further. Since the motor is still connected across the supply line 70, 71, in series with the resistor 75, however, a certain definite voltage will be applied to the motor for maintaining it in operation at a low speed. The exact speed depends upon the values of the resistors 75 and 78.

The decelerating portion of the cycle is indicated in Figure 3 by the angle DB and the creeping speed portion by the angle CS.

When the motor has operated at creeping speed for a short time, the segment 44 of the drum switch leaves its contact fingers 42 and 43, breaking the sealing circuit of the coil 72c of the main contactor. The contactor opens immediately to cut off the motor from the supply source and deenergize the brake coil 24e. The brake 24 immediately becomes effective and brings the motor to rest within a small portion of the operating cycle indicated by the angle B in Figure 3. Since the motor is always operating at a certain definite low speed when the brake is applied, it will drift a substantially constant amount, for any given adjustment of the brake, so that it will reach substantially the same initial position at the end of every cycle. This drifting movement is sufficient to cause the segment 57 to move away from its fingers 51 and 52 to de-energize the contactor coil 77c and open the contact 77 thereof, and to cause segment 44 again to bridge its contacts 42 and 43. The brake coil 24e is designed so that it will hold the brake in the off position as long as the main contactor 72 is closed to maintain the motor in operation at creeping speed.

The shear, its motor, and the drum switch 25 have now been returned to rest at their initial positions and, even though the contacts 20 are bridged by the flag 18, as long as the piece 19 engages the flag, no further operation of the shear will result until the leading end engages a flag 79. This flag, when engaged by the piece 19, is effective to close momentarily a pendulum switch 80 which is released for return to the off position after the finger of the flag which engages the pendulum slips past the latter. The flag 79 is spaced at a distance from the shear equal to the length of material it is desired to shear for delivery to the cooling bed. These cooling bed lengths are generally longer than the pieces which result from continuous operation of the shear. The pendulum switch 80 is connected in parallel with the push button switch 73 and therefore effects a complete cycle conforming exactly to that just described as a result of the operation of the push button switch. After the completion of the cycle and the restoration of normal conditions, a second cooling bed length will be cut, and so on until the piece has been entirely sheared into cooling bed lengths. When the trailing end of the piece leaves the flag 18, the subsequent engagement of the leading end of the last piece shorter than the cooling bed lengths, with the flag 79, will not cause a shearing cycle. In other words, there must be enough material approaching the shear to hold the flag 18 in its upper position and simultaneously shift the flag 79. After the dropping of the flag 18, no further shearing cycles will be effected.

If it is desired to shear lengths shorter than cooling bed lengths, the switch 74 is closed. This switch is in parallel with the push button switch 73 and the pendulum switch 80 and, therefore, is effective to start a succession of shearing cycles as soon as the flag 18 is raised by material approaching the shear. If the switch 74 remains closed, however, the system will operate to produce one shearing cycle immediately following its predecessor and the material will be cut into shorter lengths, depending upon the time necessary to effect a complete cycle, and the speed of travel of the material. One or both of these variables may be subject to adjustment. The motor 21, for example, may have a shunt winding by which its maximum speed may be controlled. The value of the resistor 75, furthermore, may be changed to provide different accelerating characteristics. In either case, successive operating cycles will be effected by the shear as long as the switch 74 is closed and the flag 18 raised.

The short lengths cut by continuous operation of the shear are normally not long enough to operate the flag 79 but the latter would have no effect even if operated, since it is in parallel with the switch 74, already closed. After the passage of the trailing end of the piece beyond the flag 18, the continuous operation of the shear is terminated until another piece of material approaching the shear raises the flag.

It will be apparent from the foregoing description that the system is capable of effecting a single shear cut under manual control with automatic shearing of cooling bed lengths, if desired, as well as the continuous shearing of shorter lengths. The invention thus makes it possible to take advantage of the high speed of operation characterizing rotary shears, with the ease and flexibility of control necessary to a practical solution of the problem of shearing material into various lengths.

Although I have illustrated and described herein but a single preferred embodiment of the invention, it will be recognized that numerous changes in the apparatus as disclosed may be made without departing from the spirit of the invention or the scope of the appended claims.

I claim:

1. The combination with a shear adapted to cut moving material in successive cycles, of an electric motor for operating said shear, a mechanical brake for stopping said shear, and control mechanism including a starting switch, effective during a shearing cycle to cause starting of the shear, dynamic braking to check the motor speed, and thereafter a mechanical braking operation to stop the motor and shear.

2. Control mechanism for shears including an electric motor, means for driving the motor at creeping speed, a mechanical brake, and means for starting the motor to operate the shears and for effecting a dynamic braking operation, and an operation of said creeping speed means and mechanical brake.

3. Control mechanism for shears including a motor, means for imparting a creeping speed to said motor, a brake, and means for successively starting the motor to operate the shears, effecting a dynamic braking operation, a creeping speed operation of the motor, and an application of the brake, said means including a switch operable in timed relation to the operation of the motor.

4. The combination with a rotary shear, an electric motor for driving the shear and an electromagnetic brake for stopping the shear, of a switch for starting the motor and a control switch driven by said motor for continuing normal operation thereof for a predetermined period, and subsequently decelerating the motor by dynamic braking, driving it at at reduced speed and finally applying said electromagnetic brake.

5. In a motor-driven shear, a brake for stopping the shear and control means actuated by the motor for continuing normal operation thereof for a predetermined period after an initial start, and for decelerating the motor by dynamic braking, operating it at reduced speed and applying said brake.

6. A motor-driven shear including a brake, means for continuing the operation of the motor after an initial start and for subsequently decelerating the motor, operating it at reduced speed, and applying said brake.

7. Control mechanism for a motor-driven rotary shear comprising means for starting and accelerating the shear motor to cutting speed, means for decelerating the motor, means for operating the motor at reduced speed, and braking means operative to stop the shear in a predetermined position.

8. In a control system for a motor driven rotary shear, means for accelerating the motor to cutting speed, means for decelerating the motor by applying dynamic braking thereto, and means for mechanically braking the motor to stop the shear in a predetermined position.

9. A control system for a motor driven rotary shear for cutting lengths of material comprising manually operable means and means operated by the material to be sheared, effective for accelerating the shear motor to cutting speed, and means actuated by rotation of the motor for subsequently stopping the motor by successively applying thereto dynamic and mechanical braking.

10. A shear-motor control system including shear accelerating means, and means actuated by operation of the motor for stopping the motor by dynamically braking it, operating it at reduced speed and finally applying a mechanical brake to stop it at a predetermined position.

11. In a shear-motor control system, means for starting the motor to effect a shearing operation, and means actuated thereby for decelerating the motor, operating it at slow speed and stopping it in a predetermined position.

12. In a shear motor control system, a starting switch and a sequence switch driven by the motor for decelerating and deenergizing the motor after starting, a dynamic braking circuit, a creeping speed circuit and a mechanical brake controlled successively by said sequence switch for stopping the motor in a predetermined position.

13. The combination with a shear adapted to cut moving material, of a motor for operating the shear, a brake, and a sequence switch effective for producing dynamic braking of the motor and then setting the brake.

14. The combination with a shear adapted to cut moving material, of a motor for operating the shear, a brake, and a sequence switch effective for producing dynamic braking of the motor, operation of the motor at creeping speed, and then a setting of the brake.

15. In an apparatus for cutting moving material, the combination with a rotary shear, a motor for driving the shear, and means for starting the motor from rest and accelerating it so that the blade of the shear attains a peripheral speed substantially equal to the linear speed of the moving material, of means effective after a cutting operation for decelerating the motor and stopping the shear at a predetermined initial position.

16. In an apparatus for cutting moving material, the combination with a rotary shear, a motor for driving the shear, and means for starting the motor from rest and accelerating it so that the blade of the shear attains substantially the peripheral velocity of the moving material, of means driven by the motor for decelerating it after a cutting operation, and stopping the shear in a predetermined initial position.

17. In an apparatus for cutting moving material, the combination with a rotary shear, a motor for driving the shear, and means for starting the motor from rest and accelerating it so that the blade of the shear attains substantially the peripheral velocity of the moving material, a sequence switch driven by the motor for decelerating it after a cutting operation, and stopping the shear in a predetermined initial position.

LORENZ IVERSEN.